United States Patent
Odeh et al.

(10) Patent No.: US 7,458,424 B2
(45) Date of Patent: Dec. 2, 2008

(54) TIGHT FORMATION WATER SHUT OFF METHOD WITH SILICA GEL

(75) Inventors: Nadir M. M. Odeh, Abu Dhabi (AE); Hassan Chaabouni, Kalimantan Timur (ID); Keng Seng Chan, Kuala Lumpur (MY); Philippe Enkababian, Manggar Balikpapan (ID)

(73) Assignee: Schlumberger Technology Corporation, Sugar Land, TX (US)

( * ) Notice: Subject to any disclaimer, the term of this patent is extended or adjusted under 35 U.S.C. 154(b) by 8 days.

(21) Appl. No.: 11/740,346

(22) Filed: Apr. 26, 2007

(65) Prior Publication Data

US 2008/0035343 A1 Feb. 14, 2008

Related U.S. Application Data

(60) Provisional application No. 60/747,344, filed on May 16, 2006.

(51) Int. Cl.
*E21B 33/13* (2006.01)
(52) U.S. Cl. ...................... 166/293; 166/300
(58) Field of Classification Search ........................ None
See application file for complete search history.

(56) References Cited

U.S. PATENT DOCUMENTS

| | | | |
|---|---|---|---|
| 3,701,384 A * | 10/1972 | Routson et al. ............. | 166/292 |
| 3,759,326 A | 9/1973 | Christopher | |
| 3,817,330 A | 6/1974 | Christopher | |
| 3,868,999 A | 3/1975 | Christopher | |
| 3,965,986 A | 6/1976 | Christopher | |
| 4,732,213 A | 3/1988 | Bennett | |
| 4,901,797 A * | 2/1990 | Summers et al. ............. | 166/292 |
| 5,151,131 A | 9/1992 | Burkhalter | |
| 5,551,514 A | 9/1996 | Nelson | |
| 6,011,075 A * | 1/2000 | Parris et al. .................. | 521/64 |
| 6,257,335 B1 | 7/2001 | Nguyen | |
| 6,364,020 B1 | 4/2002 | Crawshaw | |
| 6,450,260 B1 | 9/2002 | James | |
| 6,869,256 B2 * | 3/2005 | Greenwood et al. ......... | 405/263 |
| 7,013,973 B2 | 3/2006 | Danican | |
| 2005/0098315 A1 | 5/2005 | Danican | |

FOREIGN PATENT DOCUMENTS

| | | |
|---|---|---|
| EP | 0260888 | 3/1988 |
| GB | 2392460 | 3/2004 |

OTHER PUBLICATIONS

SPE 18505 J.J. Jurinak & L.E. Summers; Oilfield Applications of Colloidal Silica Gel; Society of Petroleum Engineers; 1991.

* cited by examiner

*Primary Examiner*—Zakiya W Bates
*Assistant Examiner*—Angela M DiTrani
(74) *Attorney, Agent, or Firm*—Thomas O. Mitchell; Darla Fonsca; David Cate

(57) ABSTRACT

A delayed gelling system useful in conformance control in the production of petroleum from subterranean formations, especially low permeability formations, is disclosed. The gelling system comprises a basic silica sol, an activator comprising a hydroxyl donor, and an optional syneresis inhibitor. In the disclosed method of using the gelling system, the gelling system may be pumped into formations with excessive water and/or gas production and thermally activated in the formation at downhole conditions to form a hard gel to reduce water and/or gas production.

15 Claims, 1 Drawing Sheet

Filtration at 127°C (260°F).

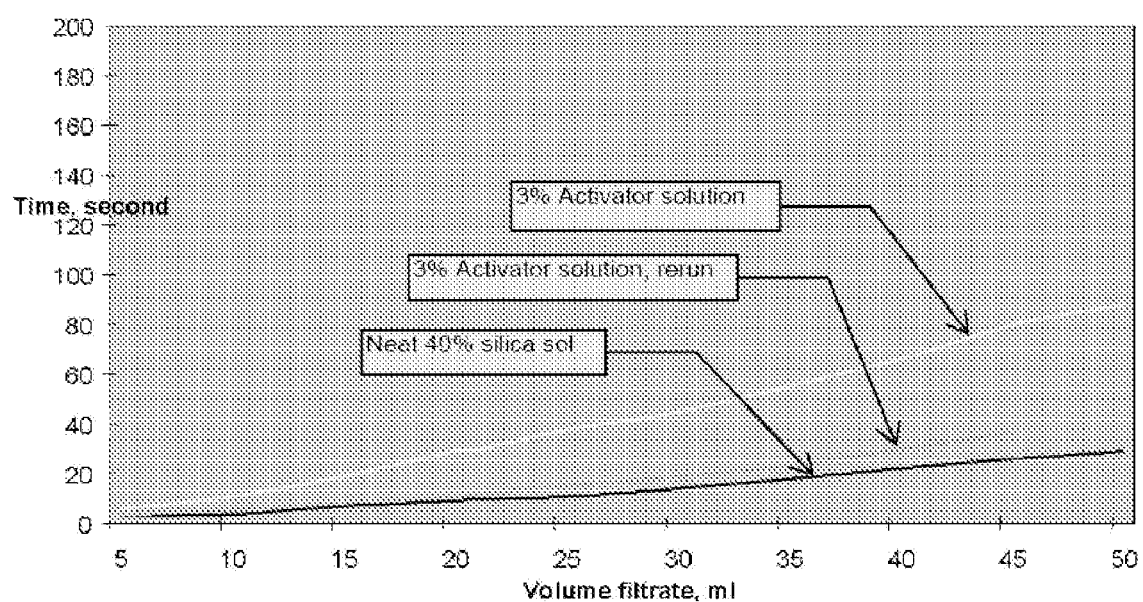
Fig. 1. Filtration at 127°C (260°F).

TIGHT FORMATION WATER SHUT OFF METHOD WITH SILICA GEL

CROSS REFERENCE TO RELATED APPLICATIONS

This application is based on and claiming priority to provisional application 60/747,344, filed May 16, 2006.

FIELD OF THE INVENTION

The invention relates to delayed gelling systems and conformance control in oil and gas reservoirs using the delayed gelling system, and more particularly to delayed gel systems and methods based on solid silica gels.

BACKGROUND OF THE INVENTION

The following terms will be used in this document: A "treating fluid" or "treatment fluid" is a fluid that is used for treating a well. In this particular case, it is generally a water shutoff fluid. It should be understood that the same materials and techniques may generally be used for water shut off and for gas shut off, either or both of which are called "conformance control," and that when we speak of water shut off compositions and methods we intend gas shut off to be included. In the case of a delayed water shut off treatment fluid that contains colloidal silica and urea, the "delayed water shut off gel" is a gel formed by the delayed water shut off treatment fluid. For example, a delayed water shut off treatment fluid that contains colloidal silica and N,N'-dimethyl urea according to the present invention will typically form a hard gel in about 1 to about 20 hours (this is called the "working time" and depends upon such factors as the component concentrations and the temperature).

In subsurface formations, naturally occurring rocks are generally permeable to fluids such as water, oil, or gas (or some combination of these fluids). It is believed that the rock in most oil-bearing formations was completely saturated with water prior to the invasion and trapping of petroleum. The less dense hydrocarbons migrated to trap locations, displacing some of the water from the formation, the trap becoming a hydrocarbon reservoir. Thus, reservoir rocks normally contain both petroleum hydrocarbons (liquid and gas) and water. Sources of the water in a reservoir may include flow from above or below the hydrocarbon zone, flow from within the hydrocarbon zone, or flow from injected fluids and additives resulting from drilling, completion, and/or production activities. The naturally occurring water is frequently referred to as "connate water" or "formation water" and becomes produced water when the reservoir is produced and these fluids are brought to the surface. Produced water is any water that is present in a reservoir with the hydrocarbon resource and is produced to the surface with the crude oil or natural gas. When hydrocarbons are produced, they are typically brought to the surface as a produced fluid mixture.

As production continues, it is common that an increasing proportion of the produced fluids is water. There are some strategies that can be used to restrict water from entering the well bore. These involve mechanical blocking devices or chemicals that "shut off" water-bearing subterranean formations, channels, or fractures within the formation and prevent water from making its way to the well. Operators have used various mechanical and well construction techniques to block water from entering the well. Several examples of these techniques are straddle packers, bridge plugs, casing patches, and cement plugs (or cement squeezes).

These techniques have been used for many years, but they do not work well in all applications. Mechanical approaches can be used to block casing leaks, or flow behind the pipe without flow restrictions, and to block unfractured wells with barriers to cross flow. However, these approaches may not be effective in solving other types of water production problems. Another drawback of these mechanical methods is the physical restriction left in the wellbore. This restriction can, in some cases, prevent the subsequent perforation or the mechanical isolation of an interval located below the treated interval.

Another approach to shutting off unwanted water or gas production while allowing continued production of oil or gas involves the use of gel-based shut-off fluids. These fluids are introduced deep into the pore matrix of the formation that is producing unwanted water or gas, and into the channel or fracture network, where they undergo physical transformation from a solids free squeezable liquid to a highly viscous or rigid material. Two families of gel-based shut-off fluids are typically used. Polymer gels typically contain an acrylamide gel and a cross-linker. The physical transformation occurs when the polymer is cross-linked. This process is triggered by time and/or temperature and can be delayed to allow sufficient time for placement in the target formation. Inorganic gels typically contain a metallic or silicate salt and an activator. The physical transformation occurs when the pH of the solution is modified by chemical reaction of the activator. This process is also triggered by time and/or temperature and can also be delayed to allow sufficient time for placement into the target formation.

Gel-based shut-off treatments are typically formulated to "set" by precipitation or cross-linking after several hours so that enough time is available for the treatment to be pumped and squeezed into the target formation. This delay time is also known as working time.

Background information on conformance control of a petroleum reservoir with a delayed gel can be found in Borling et al., "Pushing Out the Oil with Conformance Control," *Oilfield Review*, p. 44 (April 1994). This reference discusses conformance control with, among others, (i) the DGS™ (Trademark of Schlumberger Technology Corporation) inorganic gel system, based on aluminum hydroxyl chloride-urea, (ii) the MARA-SEAL™ (Trademark of Marathon Oil Corporation) polymer gel system, based on partially hydrolyzed polyacrylamide-chromium acetate, and (iii) the BP/ARCO gel system based on partially hydrolyzed polyacrylamide-aluminum citrate.

General background information on water shut off with polyacrylamide and other polymers is seen in U.S. Pat. Nos. 5,125,456 and 5,957,203, both to Hutchins et al., U.S. Pat. No. 4,039,029 to Gall, U.S. Pat. No. 5,382,371 to Stahl et al., and U.S. Pat. No. 5,010,954 to Falk.

General background information on inorganic gels is found in U.S. Pat. No. 4,889,563 to Parker et al. which teaches a process for retarding and controlling the formation of gels or precipitates from aluminum hydroxyl chloride with a delayed activator such as urea or hexamethylene-tetramine, optionally with gelling additives such as citrate and tartrate and/or crystallizing additives such as sulfate, oxalate and succinate.

Conformance control with silica sols is generally described in U.S. Pat. No. 4,732,213 to Bennett et al. (Conoco). A method of completing poorly consolidated formations with an aqueous solution of colloidal particles is described in U.S. Pat. No. 7,013,973 to Danican et al. (Schlumberger). General background information on the testing of colloidal silica gels may be found in Jurinak et al., "Laboratory Testing of Colloidal Silica Gel for Oilfield Applications," SPE Paper No. 18505, 1991.

SUMMARY OF THE INVENTION

The delayed gelling system of this invention forms a solid gel from a basic colloidal silica sol where silica particles are present in the sol at from 15 to 70 percent by weight which is activated by a thermally releasable hydroxyl donor that further increases the pH. The hydroxyl donor is present in amounts of from 0.1 to 10 percent by weight.

In one embodiment the invention provides a delayed gelling system including a basic colloidal silica sol and an activator comprising a thermally releasable hydroxyl donor. The delayed gelling system in one embodiment has a pH between 9 and 12 and in another embodiment a pH between 9 and 10.

In one embodiment, the silica comprises negative ionic surface modification, and in another the silica is surface modified with aluminate ions.

In an embodiment, the silica is present at from 30 to 50 percent by weight. The viscosity of the sol can preferably be less than 5 cP at and above 70° C. In one embodiment, the silica has an average particle size from 4 to 300 nm and a specific surface area of from 100 to 300 $m^2/g$.

In one embodiment, the hydroxyl donor is selected from the group consisting of urea, monoalkyl-substituted urea, dialkyl-substituted urea, hexamethylene tetramine, cyanates, and combinations thereof, and in another, the hydroxyl donor is selected from urea and N,N'-dimethyl urea. In some embodiments the concentration of the hydroxyl donor is from 0.5 to 5 percent by weight.

In an embodiment, the delayed gelling system also includes a syneresis inhibitor, such as, for example, a sulfate. In some embodiments, the syneresis inhibitor is present at from 0.05 to 0.1 percent by weight.

In one embodiment, the delayed gelling system may include an ionic strength modifier such as a salt present, for example, at a concentration of from 0.1 to 10 percent by weight, or from 0.5 to 5 percent by weight.

The present invention also provides a method of inhibiting permeability of a portion of a subterranean formation. The method can include the steps of: (a) preparing the stable aqueous colloidal dispersion described above, e.g. comprising from 15 to 70 weight percent of silica particles having an average particle size from 4 to 300 nm and a surface modification with negative ions, from 0.5 to 5 weight percent of an activator comprising a thermally activatable hydroxyl donor, and having a pH of at least 9; (b) injecting the colloidal dispersion into a portion of a subterranean formation having a temperature above the thermal activation temperature of the hydroxyl donor to elevate the pH; (c) setting the colloidal dispersion into a hard gel in place in the formation to inhibit water permeability of the portion of the formation; and (d) producing fluid from a remaining portion of the formation.

In one embodiment, the dispersion is injected into the formation at a viscosity less than 5 cP. In another, the formation temperature is from 80 to 180° C. The set time can be adjusted as desired, e.g. from 1 to 12 hours. The produced fluid preferably comprises oil and/or gas or sometimes water. In one embodiment, the formation is a tight formation.

BRIEF DESCRIPTION OF THE DRAWING

FIG. 1 is a graph showing the filtration rate of several aqueous solutions of colloidal particles according to embodiments of the invention.

DETAILED DESCRIPTION OF EMBODIMENTS OF THE INVENTION

The gelling system of the present invention comprises a delayed gel formed from a basic aqueous solution of colloidal particles, with gelling control by hydroxyl donors and an optional syneresis inhibitor. The crosslinking reactions of this new system are controllable and robust. The pre-gel fluid before it sets has a low viscosity for pumping and placement. One use of the fluid is pumping into a formation with a low permeability, such as less than 100 millidarcies (mD), less than 50 mD, less than 10 mD, less than 1 mD, for example from 1 to 100 mD or from 0.001 to 1 mD. As used herein, a "tight formation" is one with permeability less than 100 mD.

Colloidal suspensions are typically dispersions of discrete very small particles, spherical or elongated in shape, charged so that the repulsion between the same charged particles stabilizes the dispersion. Disturbance of the charge balance due for instance by removing the water, changing the pH or adding salt or water-miscible organic solvent, causes the colloidal particles to aggregate, resulting in the formation of a gel.

The dispersion is prepackaged as a liquid, transparent in the case of relatively low concentration of particles, becoming opalescent or milky at higher concentration. In any case, the dispersion may be handled as a liquid, which greatly simplifies the preparation and use of fluids.

Commercial solutions of colloidal particles typically include silica (also known as silica sol) and/or oxides of aluminum, antimony, tin, cerium, yttrium and zirconium. The particles are mostly spherical with particles sizes usually ranging from about 4 nm to about 250 nm, but elongated particles, with a length up to 300 nm are also available and believed to be acceptable for the invention. The particles may have a negative or positive charge. Negatively charged particles may be surface modified with aluminate ions, for example. Aqueous solutions of colloidal silica particles, with particle sizes ranging between about 4 nanometers and about 100 nanometers have been found to have an excellent injectivity in tight formations with permeabilities as low as 1 mD or less to 50 mD. Preferred colloidal particles have a size between 4 and 22 nanometers. This unique property allows a treatment of the formation to a desired depth. Without willing to be bound by any theory, it is believed that upon the addition of a pH modifier and/or an ionic-strength modifier, the interparticle collision rate is increased and siloxane bonds (Si—O—Si) are formed. This results in a hard gel that plugs the formation interstices. Indeed, after water shut off according to the invention, a portion of the formation that before treatment exhibits excessive water production can be plugged to a retained permeability of less than 0.1 percent.

Commercial silica sols are available at concentrations running between 15 and 50 wt %. Those commercial solutions can be used as such or diluted to a lower silica content. For example, sols containing between 25 or 30 wt % of silica as a lower limit and 50 or 70 wt % of silica as an upper limit are generally used for the purposes of this invention, but may be diluted down to 2 wt % where a hard gel is not necessary. Note that the volume of injected solution typically remains the same when diluted solutions are used but a gel of less rigidity is obtained.

Freezing temperatures cause crystals of ice to form in colloidal silica solutions, which increases the concentration of silica in the unfrozen portion and accelerates gelation of the silica-rich fraction. On thawing, the gelled silica does not redisperse but remains as a sediment in the melted ice. As a result, the melted material also contains a reduced concentration of dispersed silica particles and is usually unsuitable for use. Irreversible gelation of colloidal silica at temperatures below 0° C. can be prevented by mixing said colloidal silica solution with, for example, ethylene glycol, propylene glycol or methanol at a concentration comprising from 0.1 to 10 wt %, preferentially between 0.1 and 5 wt %.

The gel formation is triggered by a pH modifier with or without an ionic-strength modifier. According to one embodiment of the present invention, said pH modifier is a base. Colloidal silica dispersions used for conformance control applications have mostly a pH between 9 to 12, preferably 9 to 10. By adding a hydroxyl donor, the pH of the colloidal dispersion can be further increased to accelerate gel formation. In this way, the charges on the surface of the silica particles are decreased and the particles can come into contact and form siloxane bonds. It has been discovered that the tendency of basic colloidal silica to gel is increased at a pH above about 10. The gelation time can be adjusted with the pH of the solution and/or the temperature for a given silica particle size and concentration.

According to another embodiment of the present invention, the set time can be further adjusted by using, in addition to the pH modifier, an ionic strength modifier. In an embodiment, said ionic-strength modifier may be a salt. In this case, the colloidal silica suspension (e.g., Ludox® HS-40 and hydroxyl donor) is mixed with a brine (the salts contained in this brine are preferentially potassium chloride, sodium chloride, and calcium chloride but can also be any mineral or organic salts or compounds susceptible to modify the ionic strength of the colloidal solution). In a salt-free sol, the positive/negative counter ions balancing the negative/positive surface charge are diffusely oriented around the particle; as salt is added, the counter ions move much closer to the particle surface, which reduces the distance through which the repelling forces act. This causes a reduction in sol stability by increasing the probability of interparticle collision and this induces the formation of a hard gel. Besides the pH modifier, the gelation time can be further adjusted with the brine concentration or the temperature. Particle size distribution and particle concentration can also effect gelation time.

The concentration of the pH modifier and of the ionic strength modifier is comprised between 0.1 and 5 wt % and preferentially comprised between 0.1 and 1.5 wt %.

The volume of conformance control fluids to inject is preferably equal to at least the volume of the pores of the portion of the formation to be plugged. Said volume is usually no more than 10 times the volume of the pores in the area to be plugged. In general, the area to be plugged has a depth of between about 0.5 and about 10 m, or between about 2 and about 7 m, typically about 4 m, although it is not unheard of to plug extended distances, and theoretically as far as the control fluid can reach for extended pumping periods up to the set time of the first-injected fluid.

The delayed activating agent in the pre-gel solution is generally any hydroxyl donor, i.e. pH adjusting agents that hydrolyze or decompose thermally to release a base or consume an acid, such as, for example: quaternary ammonium salts; urea and substituted urea including N,N'-dialkyl urea, especially N,N'-dimethyl urea; coordination compounds such as cupric ammonium sulfate for example; salts of a strong base and a weak acid; combinations thereof; and the like. As specific representative examples there can be mentioned urea, N,N'-dimethyl urea, hexamethylene tetramine, cyanates, and the like. In the term "hydroxyl donor" we include agents that cause a hydroxyl to be released by another compound; such an agent is, for instance, a "Lewis base". A Lewis base has a lone pair of electrons that can be used to co-ordinate with an electron deficient species, such as a proton. In the presence of water, urea can abstract a proton from the water and produce an $^-$OH from the water. In a general embodiment, the hydroxyl donor comprises from 0.5 to 20 weight percent of the pre-gel solution, and in various other embodiments has a lower concentration limit of at least 0.5, 1, 3 or 5 weight percent; an upper concentration of no more than 20, 15, 10, 8 or 5 weight percent; or a concentration range from any lower limit to any higher upper limit, e.g. from 0.1 to 10 percent by weight, or from 0.5 to 5 percent by weight of the pre-gel solution.

The syneresis inhibitor which is present in the pre-gel solution in one embodiment may be a polyvalent anion such as, for example, tartrate, citrate, sulfate, oxalate, succinate, or the like. The syneresis inhibitor generally delays or prevents separation of water from the gel over an extended period of time at formation conditions. In a general embodiment, the syneresis inhibitor, when present, comprises from 0.05 to 0.5 weight percent of the pre-gel solution. In various embodiments, the syneresis inhibitor has a lower concentration limit in the pre-gel solution of at least 0.01, 0.05, 0.1, 0.2, 0.25, 0.3, or 0.4, weight percent, an upper concentration limit of not more than 2, 1.5, 1.0, 0.8, 0.5, 0.3, or 0.1 weight percent, or a concentration range from any lower limit to any higher upper limit, e.g. from 0.05 to 0.1 weight percent.

The pre-gel solution may also contain various other additives used in water shutoff gel systems such as surfactants, thermal stabilizers, antifoaming agents, pH buffers, scale inhibitors, water control agents and cleanup additives, and the like.

The pre-gel solution is prepared by blending or mixing the silica sol, pH modifier, syneresis inhibitor, dilution water and any other additives together in any order using conventional blending and mixing equipment and methods. The pH of the blend components is maintained so as to avoid precipitation or premature gel formation, especially avoiding localized pH or salinity increases when high pH, neutral pH or salt components are added to the silica sol. The blending and storage temperature is also maintained below the activation temperature to ensure that the gel is not formed prematurely before the solution is placed in the appropriate location where the gel is desired.

The pre-gel solution is generally prepared shortly before it is used, then injected, and then heated in the reservoir to a sufficient temperature to further elevate the pH so that gelation is activated. In water- or gas-shutoff applications, also known as conformance control, the pre-gel is prepared to have the rheology required for injection into the reservoir, taking into account the temperature, permeability and fluid content of the formation, preferably a viscosity less than 5 cP at the reservoir injection conditions. The pre-gel is also prepared to give an appropriate set time upon injection into the formation, and the desired gel characteristics. For example, the set time will normally be longer than the time it takes to finish injecting the amount of pre-gel solution for the particular application. The injection of the pre-gel solution can be preceded by or followed by injection of a spacer fluid to avoid mixing with other fluids that might prematurely gel the solution. If desired, the injection of the pre-gel solution can be followed by injection of an accelerating fluid to speed up gel formation or a temporary gelling fluid to form a cap to guard against undesired pre-gel migration before it gels. The injection of the pre-gel is otherwise similar to familiar shutoff methods known in the art.

EXAMPLES

In the examples below, the activator solution was prepared by mixing 100 ml deionized water and 100 g N,N'-dimethyl urea (without $Na_2SO_4$ unless otherwise indicated). The silica sol was obtained commercially as a 40 weight percent dispersion of negatively charged (surface modification with aluminate ions), 12 nm average size silica particles with a surface area of 227 $m^2/g$, having a pH of 9.5, specific gravity of 1.3, and a viscosity (25° C.) of 18 cP.

Gelation Tests—Because the gel time is controlled by activator solution concentration and temperature, gel time tests were run to semi-quantitatively determine the time it takes for the fluid to gel or set for a given catalyst concentration at a temperature of 127° C. (260° F.). The procedure was as follows. First the mixture of silica sol and activator was prepared in a vial by adding measured amounts of silica sol and activator. The vial was then placed in a temperature-controlled oven at a temperature of 127° C. (260° F.) (monitored with a NIST calibrated thermometer and maintained to +/−0.28° C. (0.5° F.) and the flow behavior of the fluid was monitored at fixed intervals of time (30 minutes) until it gelled. The set time is defined as the time when the fluid no longer flows/yields under the influence of gravity when the vial is tilted. Where some gel was observed but the fluid still flowed, the result was reported as "gelation." For the sake of efficiency, vials containing different concentrations of activator (1, 1.5, 1.75, 2 and 3 weight percent) were run at the same time. The set time results are listed in Table 1.

TABLE 1

| Elapsed Time, hours | Activator Solution Concentration, wt % | | | | |
|---|---|---|---|---|---|
| | 1 | 1.5 | 1.75 | 2 | 3 |
| | | | Result | | |
| 0 | Not set | Not set | Not set | Not set | Not set |
| 0.5 | Not set | Not set | Not set | Not set | Not set |
| 1 | Not set | Not set | Not set | Not set | Not set |
| 1.5 | Not set | Not set | Not set | Not set | Not set |
| 2 | Not set | Not set | Not set | Not set | Set |
| 4.5 | Not set | Not set | Not set | Set | |
| 5 | Not set | Not set | Not set | | |
| 5.5 | Not set | Not set | Set | | |
| 7.5 | Not set | Set | | | |
| 9 | Gelation | | | | |
| 9.5 | Gelation | | | | |
| 10 | Gelation | | | | |
| 10.5 | Set | | | | |

The data show that different setting times were reached using different concentrations of the activator solution, that the system was easy to control, and that the setting time ranged from 2 to 11 hours, depending on the concentration of the activator.

The foregoing set-time tests were repeated, using an activator of 100 g N,N'-dimethyl urea in 100 ml deionized water but also containing 10 g $Na_2SO_4$. At 127° C. (260° F.), similar but slightly shorter setting times were obtained using similar activator solution concentrations, but with less syneresis and/or a longer onset to syneresis at temperature. For example, adding 0.5 ml of the activator containing $Na_2SO_4$ to 100 ml of the silica sol provided a system with a 10 hour setting time at 127° C. (260° F.) and a more stable gel. Gels without the syneresis inhibitor yielded free water, then dried and cracked. Gels with the syneresis inhibitor were maintained for 4 weeks in sealed jars in the oven at 127° C. (260° F.), and showed no sign of water separation, syneresis or other instability.

Filtration Screening Tests—Pre-gel solutions of the silica sol with and without the activator were filtered through 2.5-micron filter paper in a conventional fluid loss cell at 127° C. (260° F.). The testing procedure included ramping up the fluid loss cell temperature to 127° C. (260° F.) over a 30-minute heating cycle, holding the temperature at 127° C. (260° F.) for 30 minutes, cooling with flush water for 10 minutes, and then starting filtration by increasing the pressure gradually to 6.9 MPa (1000 psi). The filtrate was collected and the volume reported as a function of time. For 3% activator solution at 127° C. (260° F.), the test was re-run. Selected results are presented in Table 2 below and FIG. 1.

TABLE 2

| Activator solution concentration, vol % | 1.5 | 1.5 | 3 |
|---|---|---|---|
| Filtration temperature, ° C. (° F.) | 27 (80) | 127 (260) | 127 (260) |
| Filtrate volume, ml | Time, seconds | | |
| 5 | 2 | 11 | 11 |
| 10 | 3 | 16 | 74 |
| 15 | 6 | 22 | 216 |
| 20 | 9 | 27 | 756 |
| 25 | 14 | 36 | |
| 30 | 19 | 46 | |
| 35 | 27 | 57 | |
| 40 | 39 | 74 | |
| 45 | 63 | | |
| 47 | 74 | | |

Extrusion Tests—An 83 mD sand pack (made with 80 wt % 0.0125 mm (120 mesh) sand and 20 wt % silica flour having 8 wt % 0.074 to 0.149 mm (100-200 mesh), 35 wt % 0.044 to 0.074 mm (200-325 mesh), and 57 wt % smaller than 0.044 mm (through 325 mesh) was injected with the pre-gel silica sol described above containing 3 vol % activator (with $Na_2SO_4$). After curing at 127° C. (260° F.) for 36 hours, retained permeability in the production direction was 0.2% up to a pressure differential of 50 kPa/mm (2200 psi/ft). The core was held in a section of hose capped at either end by metal end caps connected to tubing supply and return lines. The entire core holder was placed in a temperature-controlled pressure cell with external pressure of 6.9 MPa (1000 psi) applied to the sand pack in the hose. The sand pack had a length of 83 mm (3.27 inches). The sand pack was primed with 6 wt % aqueous KCl at 1 ml/min to obtain the pore volume (9 ml), and then at 10 ml/min, 5 ml/min and 2 ml/min to obtain the permeability (83, 83 and 81 mD, respectively). A buffer solution of 0.5 wt % sodium sesquicarbonate was then pumped through the core until the effluent pH was 10 (16 ml), and an additional 10 ml of the buffer was pumped through the core. The silica sol plus activator solution (3 vol % with $Na_2SO_4$) was then pumped through the core at 1 ml/min at room temperature for 107 minutes (taking dead volume into account, approximately 97 ml or 11 pore volumes). The core holder was then capped and the heater set at 127° C. (260° F.), and the core was held at this temperature in the pressure vessel for 36 hours.

After 36 hours, the system was allowed to cool to room temperature, the core holder was removed from the pressure cell, the lines were cleaned of the gel and the screens at the ends of the sand pack were removed. The core holder was then reassembled ensuring that only fluid was in the lines, i.e. air in the lines was displaced. The core holder was installed into the cell and the cell was repressurized to a confining pressure of 6.9 MPa (1000 psi). The 6 wt % KCl solution was pumped through the core in the injection direction at a constant pressure of initially 0.34 MPa (50 psi) and then 1.03 MPa (150 psi). A finite and measurable flow rate was noted. Flow direction was then reversed and the 6 wt % KCl solution was pumped in the production direction at constant pressure. Pressure was ramped from 1.03 MPa (150 psi) to 4.1 MPa (600 psi) in 0.34 MPa (50 psi) increments. At each pressure, flow rate was measured by collecting fluid over 10 minute intervals. At least 2 measurements were done at every pressure. Table 3 below lists the flow rate (averaged and calculated per minute) for each pressure differential. The core was then left 12 hours with 4.1 MPa (600 psi) applied in the injection direction. The average flow rate, total volume collected of approximately 20 pore volumes divided by duration of 720 minutes, was 0.257 g/min. The flow rate was measured again over 10 minute intervals after the 12 hour shut in period. This yielded a flow rate of 0.257 g/min. At this flow rate and pressure drop, the retained permeability in the production direction was 0.18 mD giving a retained permeability of 0.2%.

TABLE 3

| Flow Direction | ΔP, MPa (psi) | Flow rate, g/min |
|---|---|---|
| Injection | 1.04 (151) | 0.073 |
| Production | 1.04 (151) | 0.090 |
| | 1.39 (202) | 0.079 |
| | 1.73 (252) | 0.064 |
| | 2.08 (302) | 0.075 |
| | 2.42 (351) | 0.094 |
| | 2.76 (401) | 0.122 |
| | 3.11 (451) | 0.160 |
| | 3.45 (501) | 0.197 |
| | 3.80 (552) | 0.226 |
| | 4.14 (601) | 0.265 |

In summary, the retained permeability of 0.2% was constant over the 12 hour period with an equivalent pressure differential of 50 kPa/mm (2200 psi/ft), showing that the sol could be pumped into the core sample, set at the desired time and temperature conditions, and that the resulting gel effectively plugged the core sample to inhibit fluid flow.

Although the invention is described in terms of shutoff applications, it is to be understood that it is applicable to any treatment in which a delayed gelling system is used. For example, the gelling system could also be used for fluid loss control from a wellbore, or to plug a formation, fracture, perforation, wellbore, or other location regardless of the purpose for doing so.

U.S. Pat. Nos. 4,732,213 and 7,013,873, are hereby incorporated herein by reference in their entirety and made a part of this application for the purpose of United States patent practice and other jurisdictions where permitted.

What is claimed is:

1. A method of inhibiting permeability of a portion of a subterranean formation, comprising:
    preparing a stable aqueous colloidal dispersion comprising from about 15 to about 70 weight percent of silica particles having an average particle size from 4 to 300 nm and a surface modification with negative ions, from 0.1 to 5 weight percent of a thermally activatable hydroxyl donor, and having a pH of from about 9 to about 12;
    injecting the colloidal dispersion into a portion of a subterranean formation having a temperature above the thermal activation temperature of the hydroxyl donor to elevate the pH;
    setting the colloidal dispersion into a hard gel in place for from 1 to 12 hours in the formation to inhibit water permeability of the portion of the formation; and
    producing a fluid selected from oil, gas and water from a remaining portion of the formation.

2. The method of claim 1 wherein the dispersion comprises a pH between 9 and 10.

3. The method of claim 1 wherein the silica in the dispersion is surface modified with aluminate ions.

4. The method of claim 1 wherein the dispersion is injected into the formation at a viscosity less than 5 cP.

5. The method of claim 1 wherein the silica has an average particle size from 4 to 300 nm and a specific surface area of from 100 to 300 m$^2$/g.

6. The method of claim 1 wherein the hydroxyl donor is selected from the group consisting of urea, monoalkyl-substituted urea, dialkyl-substituted urea, hexamethylene tetramine, cyanates, and combinations thereof.

7. The method of claim 1 wherein the hydroxyl donor is selected from urea and N,N'-dimethyl urea.

8. The method of claim 1 wherein the dispersion further comprises a syneresis inhibitor.

9. The method of claim 8 wherein the syneresis inhibitor is selected from sulfates.

10. The method of claim 1 wherein the dispersion further comprises an ionic strength modifier.

11. The method of claim 1 comprising from 30 to 50 weight percent silica, from 0.1 to 5 weight percent of the hydroxyl donor, and from 0.01 to 0.5 weight percent of the syneresis inhibitor.

12. The method of claim 1 wherein the formation temperature is from 80 to 180° C.

13. The method of claim 1, wherein the silica particles have an average particle size greater than 100 nm.

14. The method of claim 1, wherein the silica particles have an average particle size greater than 150 nm.

15. The method of claim 1, wherein the stable aqueous colloidal dispersion has a pH greater than about 10.

* * * * *